United States Patent [19]
Ruppert et al.

[11] Patent Number: 5,878,830
[45] Date of Patent: Mar. 9, 1999

[54] SPACE SAVING MOUNTING FOR ELECTRICALLY DRIVEN VEHICLE WHEELS

[75] Inventors: Malcolm F. Ruppert, Hebron; Dean Mark House, Pataskala; William Carl Sullivan, Newark; Silvio Masaaki Yamada, Gahanna, all of Ohio

[73] Assignee: Meritor Heavy Vehicle Systems, LLC., Troy, Mich.

[21] Appl. No.: 801,536

[22] Filed: Feb. 18, 1997

[51] Int. Cl.$^6$ .................................................. B60K 1/00
[52] U.S. Cl. ........................... 180/65.5; 74/411; 74/417; 74/424; 180/65.6
[58] Field of Search .................... 74/411, 417, 423, 74/424; 180/65.5, 65.6, 214, 220, 226, 907, 337

[56] References Cited

U.S. PATENT DOCUMENTS

| | | |
|---|---|---|
| 1,543,044 | 6/1925 | Anglada . |
| 3,012,441 | 12/1961 | Lamb et al. ......................... 74/417 X |
| 3,195,324 | 7/1965 | Sellwood et al. .................... 74/411 X |
| 3,812,928 | 5/1974 | Rockwell et al. . |
| 3,871,248 | 3/1975 | Barish .................................. 74/417 X |
| 3,930,551 | 1/1976 | Cragg . |
| 4,270,622 | 6/1981 | Travis . |
| 4,330,045 | 5/1982 | Myers . |
| 5,222,568 | 6/1993 | Higasa et al. .......................... 180/65.5 |
| 5,368,122 | 11/1994 | Chou ................................... 180/65.6 X |

*Primary Examiner*—Brian L. Johnson
*Assistant Examiner*—Michael Mar

[57] ABSTRACT

An improved mount for an electric motor and drive gear includes mounting both of the motor and drive gear within a gear housing for a vehicle wheel. The motor is mounted on one side of the drive axis of the wheel, and the drive gear is mounted in bearings on an opposed side of the drive axis. In this way, the overall longitudinal distance required for mounting both the motor and the drive gear is reduced when compared to the envelope of the vehicle wheel.

6 Claims, 2 Drawing Sheets

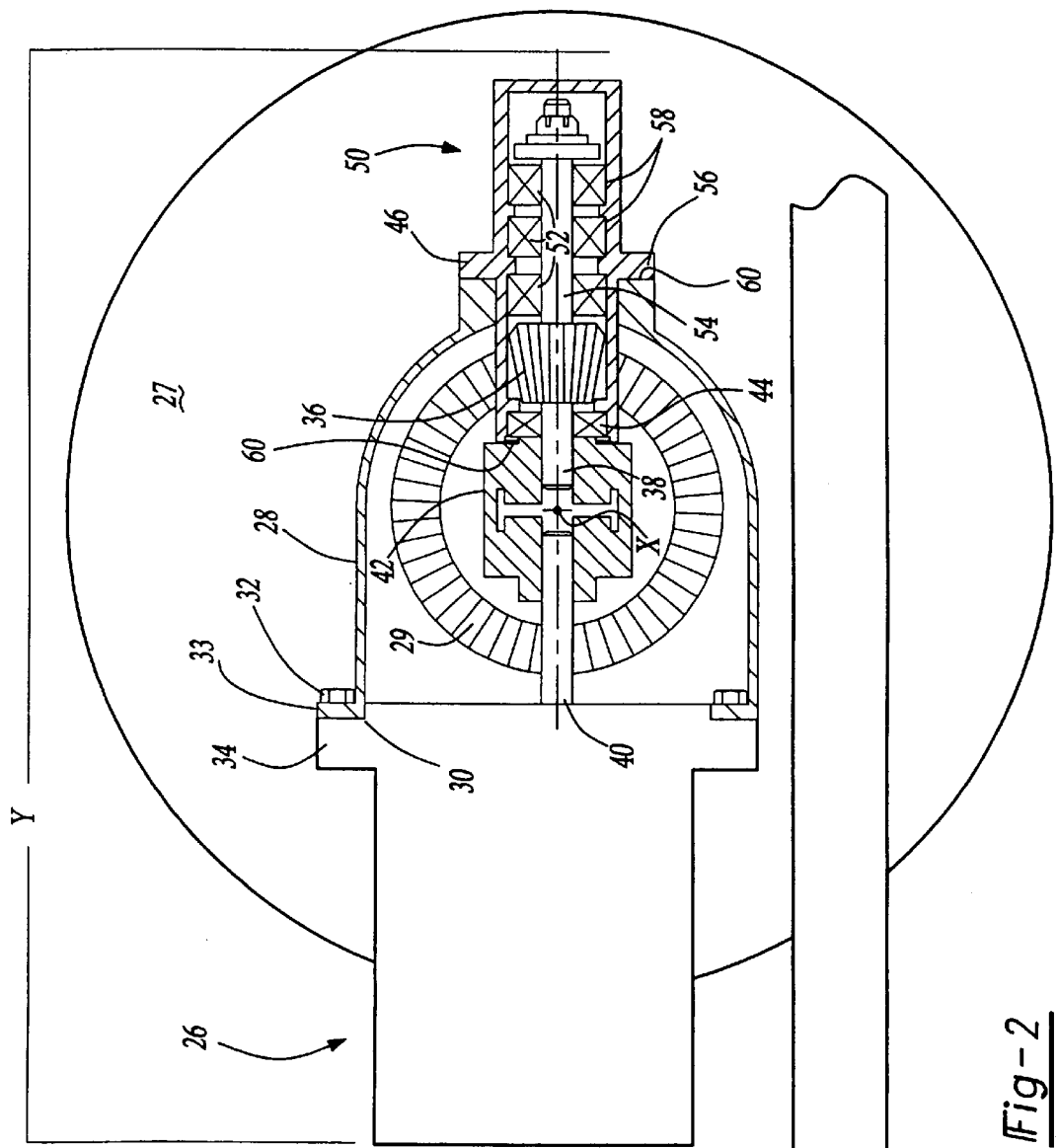
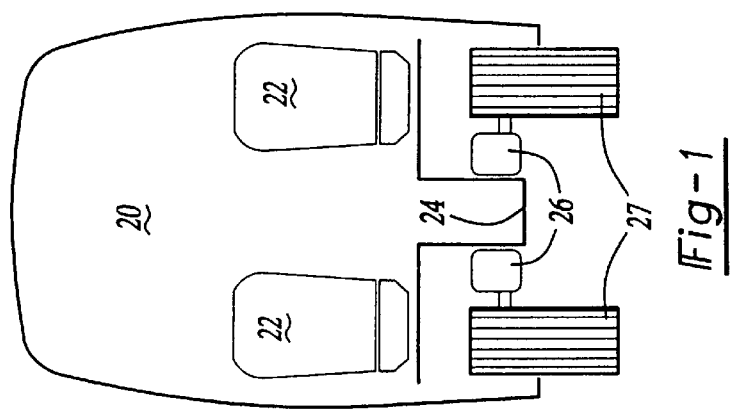
Fig-2
Fig-1

SPACE SAVING MOUNTING FOR ELECTRICALLY DRIVEN VEHICLE WHEELS

BACKGROUND OF THE INVENTION

This invention relates to a unique mounting for conserving space in the vicinity of electrically driven vehicle wheels.

In the prior art, mass transit vehicles such as buses or trollies typically include seats mounted at each lateral side of the vehicle. An aisle is defined between the seats. Typically, these vehicles have been driven by electric motors, or internal combustion engines, mounted at the vehicle center. Transmissions extend from the drive sources to the driven wheels. In the prior art, there are relatively large motor, transmission, or axle elements directly below the center of the vehicle. The aisle is typically in the center of the vehicle and normally goes over the axle, thus requiring the floor of the aisle to be relatively high. In at least one bus, the floor rises over the axle by steps. It is undesirable to have passengers climb the steps to reach the aisle and seating areas. Thus, it would be desirable to lower the floor of the vehicle to reduce the number of steps required to reach the seating areas, and to improve handicap access and ease of passenger loading and unloading.

It has been proposed in co-pending patent application Ser. No. 08/801,531, entitled "Low Floor Drive Unit Assembly for An Electrically Driven Vehicle" to utilize laterally spaced electric drive motors associated with each driven wheel. The motors are positioned adjacent each wheel, and arranged to drive the wheel through a bevel gear connection. The lateral distance between the motors does not receive transmission or motor elements. In this way, the aisle floor may be vertically lower.

It would be desirable to improve the concepts disclosed in the above-mentioned patent application, and to further conserve space.

SUMMARY OF THE INVENTION

In a disclosed embodiment of this invention, a bevel gear drive connection between a motor and a wheel hub is arranged to conserve and optimize space adjacent the wheel. In a preferred embodiment of this invention, the bevel gear is mounted on one side of the wheel drive axis, and the motor is mounted on the other. In this way, undue space is not required for the motor on either side of the wheel axis.

In the prior art, certain modifications of the floor are necessary to accommodate the wheel. Typically, a portion of the floor extends upwardly over the wheel. With the above-described prior art system, the motor is still positioned laterally inwardly of the wheel, and thus the floor must also move over that motor. In such a system, it would be desirable to minimize the longitudinal distance through which the motor and its associated gearing extends. In this way, the floor must only extend upwardly to surround the wheel and the motor for a minimum longitudinal distance.

In a preferred embodiment of this invention, the motor is mounted to an open side of a gear housing. The gear housing may be associated with the axle housing for the vehicle. The motor is bolted to the gear housing, and closes the opening. A bevel gear is mounted in the gear housing at an opposed side of the vehicle drive axis from the motor. The bevel gear is preferably mounted in a pair of bearings at the opposed side, and within the gear housing. A flexible connection may connect the drive shaft for the motor to the bevel gear. In this way, it is not necessary to mount the bevel gear, its associated bearings, and the motor all on one side of the vehicle drive axis. Instead, portions of the assembly are mounted on both sides of the vehicle drive axis. The motor assembly need not extend longitudinally far in either direction from the wheel drive axis.

BRIEF DESCRIPTION OF THE DRAWINGS

FIG. 1 is a generally schematic view showing an improved arrangement of electric motors for driving a vehicle.

FIG. 2 shows an improved coupling for the motor shown in FIG. 1.

DETAILED DESCRIPTION OF A PREFERRED EMBODIMENT

Figure 3:
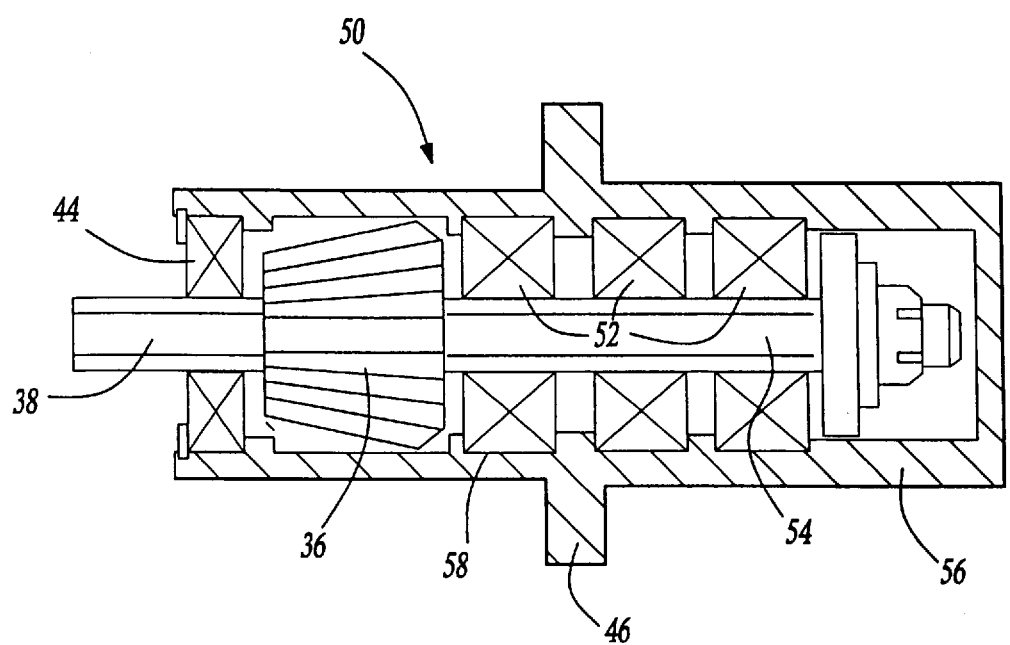
FIG. 3 shows details of the mounting of the inventive pinion gear.

As shown in FIG. 1, a mass transit vehicle 20 incorporates seats 22 at each lateral side. An aisle 24 is defined between the seats 22. The aisle may have a relatively low floor due to the mounting of motors 26 adjacent the wheels 27. This invention is described generally in co-pending patent application Ser. No. 08/801,531, entitled "Low Floor Drive Unit Assembly For An Electrically Driven Vehicle". One embodiment disclosed in co-pending patent application Ser. No. 08/801,532, entitled "Suspension Drive Unit Assembly For An Electrically Driven Vehicle".

FIG. 2 shows an improvement according to the present invention wherein a motor 26 for driving wheel 27 is connected to a gear housing 28. The gear housing 28 may be a portion of the axle housing for wheel 27. A bevel gear 29 is shown for driving wheel 27. Bevel gear 29 is preferably associated with appropriate gearing to drive wheel 27. Examples of appropriate gearing are disclosed in the above-referenced co-pending patent applications.

As shown, the housing 28 includes an open end 30. Open end 30 is closed by the attachment of motor 26. As shown, bolts 32 attach a flange 33 from the gear housing 28 to a flange 34 from the motor 26.

As also shown, a drive pinion gear 36 engages and drives the bevel gear 29. Pinion gear 36 includes an input shaft 38 which receives drive rotation from an output shaft 40 of the electric motor 26. The shafts 38 and 40 are interconnected by a flexible coupling 42. As shown, the gear housing 28 incorporates an opposed mounting portion 50 at a side of a central drive axis X opposed from the mounting of the motor 26. As shown in greater detail in FIG. 3, the mounting portion 50 includes a first bearing assembly 52 which mounts a shaft portion 54 for the gear 36 and a second bearing assembly 44 which mounts the input shaft 38 for the gear 36. It is understood that the first and second bearing assemblies include at least one bearing, but a greater number of bearings can also be used. As shown in FIGS. 2 and 3, the first bearing assembly 52 includes three angular contact bearings and the second bearing assembly 44 includes a single bearing. It is necessary for gear 36 to be adequately supported in bearings such that it is able to transmit sufficient torque to rotate wheel 27. In the present invention, the positioning of bearings on an opposed side of the axis X from motor 26 results in a smaller overall envelope required for the entire system shown in FIG. 2. As shown, bearings 52 are mounted in a bearing housing 56 having bearing support portions 58. Bearing housing 56 encloses an open end 60 of gear housing 28.

In order to assemble the opposed mounting portion 50 into the gear housing 38, the bearing housing 56 inserted into the open end 60 of gear housing 28 such that the pinion gear 36 teeth and the bevel gear 29 teeth do not mesh. After initial positioning of the opposed mounting portion 50, the bearing housing 56 is moved horizontally such that a flange portion 46 of the bearing housing 56 encloses the open end 60 of the gear housing 28 resulting in the meshing of pinion gear 36 teeth with the bevel gear teeth 29.

With the present invention, electric motor 26 is mounted on one side of the gear housing 28, and drives pinion gear 36, which is mounted on one side of the axis X. The positioning of the bearings 52 on the opposed side of the axis X from the motor 26 results in an envelope Y which does not extend far beyond the size required for wheel 27. The floor of the vehicle must rise to accommodate wheel 27, and must also extend longitudinally slightly forwardly and rearwardly from the wheel. Thus, by the inventive positioning of a good deal of the bearings, etc., for the gears and motors within the longitudinal envelope of the wheel, the present invention does not require the floor to move upwardly to cover the motor and gearing by any significant additional longitudinal amount.

It should also be understood that a similar coupling is mounted at the opposed lateral side of the vehicle and would drive its own wheel 27.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A transmission for driving a vehicle wheel comprising:
   a wheel hub carrying a wheel having a transversely extending drive axis;
   a single driven gear mounted for rotation about said drive axis and operatively connected to drive said wheel hub;
   a single drive gear mounted at 90 degrees relative to said drive axis for rotation about a longitudinal axis, said drive gear engaging said driven gear such that rotation of said drive gear about said longitudinal axis causes resultant rotation of said driven gear about said drive axis of said wheel; and
   an electric motor having a motor drive shaft mounted for rotation about said longitudinal axis and operatively connected to drive said drive gear, said electric motor mounted on one longitudinal side of said drive axis, and said drive gear being rotatably mounted on an opposed side of said drive axis.

2. An assembly as recited in claim 1, wherein said drive gear is mounted within bearings mounted in a housing on a first side of said drive axis, and said electric motor is mounted to said housing on a second side of said drive axis.

3. An assembly as recited in claim 1, wherein said drive gear has a gear drive shaft rotated by said motor drive shaft, wherein a flexible connection connects said motor and gear drive shafts.

4. An assembly as recited in claim 3, wherein said drive shaft of said drive gear extends from said drive gear towards said electric motor, said drive gear having a shaft on an opposed side of said drive gear from said drive shaft, said shaft being received in bearings mounted in a housing.

5. An assembly as recited in claim 1, wherein said drive and driven gears being mounted within a gear housing, said gear housing having an opening at one end, said electric motor being connected to said opening of said drive housing to close said opening.

6. A transmission for driving a vehicle wheel comprising:
   a wheel hub having a transversely extending drive axis;
   a single driven bevel gear mounted for rotation about said drive axis and operatively connected to drive said wheel hub;
   a single drive pinion gear mounted at 90° relative to said drive axis for rotation about a longitudinal axis, said drive pinion gear engaging said driven bevel gear such that rotation of said drive pinion gear about said longitudinal axis causes resultant rotation of said driven bevel gear about said drive axis of said wheel;
   a bearing mounted on one side of said drive pinion gear opposed to said drive axis, said drive pinion gear having a bearing shaft mounted within said bearing for rotation about said longitudinal axis; and
   an electric motor mounted on an opposed side of said drive axis from said drive pinion gear, said motor having a motor shaft connected to a flexible coupling, said flexible coupling connected to a drive shaft for driving said drive pinion gear said motor shaft and said drive shaft being mounted for rotation about said longitudinal axis.

* * * * *